(12) United States Patent
Rogalla et al.

(10) Patent No.: US 8,336,379 B2
(45) Date of Patent: Dec. 25, 2012

(54) METHOD AND DEVICE FOR COMPENSATING UNBALANCES OF VEHICLE WHEELS

(75) Inventors: Martin Rogalla, Darmstadt (DE); Dieter Thelen, Modautal (DE)

(73) Assignee: Schenck RoTec GmbH, Darmstadt (DE)

( * ) Notice: Subject to any disclaimer, the term of this patent is extended or adjusted under 35 U.S.C. 154(b) by 768 days.

(21) Appl. No.: 12/448,721

(22) PCT Filed: Dec. 22, 2007

(86) PCT No.: PCT/EP2007/011414
§ 371 (c)(1),
(2), (4) Date: Jul. 2, 2009

(87) PCT Pub. No.: WO2008/080597
PCT Pub. Date: Jul. 10, 2008

(65) Prior Publication Data
US 2010/0058859 A1 Mar. 11, 2010

(30) Foreign Application Priority Data
Jan. 2, 2007 (DE) .......................... 10 2007 001 312

(51) Int. Cl.
*G01M 1/16* (2006.01)
*G01M 1/32* (2006.01)
*B60B 1/00* (2006.01)
(52) U.S. Cl. ............................ 73/470; 73/468; 301/5.21
(58) Field of Classification Search ............ 73/468–470, 73/487, 458, 460, 462; 301/5.21; 156/75, 156/358, 269, 468, 475, 486, 538
See application file for complete search history.

(56) References Cited

U.S. PATENT DOCUMENTS

| | | | |
|---|---|---|---|
| 3,748,910 A * | 7/1973 | Hofmann | 73/468 |
| 5,557,043 A * | 9/1996 | Drechsler | 73/468 |
| 5,730,827 A * | 3/1998 | Sewell | 156/269 |
| 5,959,205 A * | 9/1999 | Yamaya et al. | 73/468 |
| 6,539,852 B2 * | 4/2003 | Ertl | 100/211 |

(Continued)

FOREIGN PATENT DOCUMENTS
DE 199 22 085 12/2000
(Continued)

OTHER PUBLICATIONS

Office Action in German Patent Application 10 2007 014 461.1, mailed Oct. 31, 2007, 4 pages, German Patent and Trademark Office, Muenchen, Germany, with partial English Translation, 4 pages.

(Continued)

*Primary Examiner* — Helen C. Kwok
(74) *Attorney, Agent, or Firm* — W. F. Fasse

(57) ABSTRACT

For compensating unbalance of vehicle wheels, adhesive weight elements (8) are positioned and pressed onto a determined compensation surface (17) on a wheel (7) using a balancing head (1) and a program-controlled handling device (9). The adhesive weight elements (8) in the form of an endless weight strand (5) are fed by a feed device (2) arranged on the balancing head (1) to a following roll-on roller (3) that presses the beginning of the endless weight strand (5) onto the beginning of the compensation surface (17) and thereafter rolls along thereon. A length cut-off device (4) is provided in or before the roll-on roller (3) and cuts-off the endless weight strand (5) of the adhesive weight elements (8) in a determined length.

25 Claims, 4 Drawing Sheets

U.S. PATENT DOCUMENTS

| | | | |
|---|---|---|---|
| 6,547,338 B2 * | 4/2003 | Gross et al. | 301/5.21 |
| 6,862,933 B2 * | 3/2005 | Gross et al. | 73/462 |
| 7,237,326 B2 * | 7/2007 | Boni et al. | 29/705 |
| 7,478,659 B2 * | 1/2009 | Jeon | 156/358 |
| 7,931,342 B2 * | 4/2011 | Spaulding et al. | 73/470 |
| 2006/0076359 A1 | 4/2006 | Gross et al. | |

FOREIGN PATENT DOCUMENTS

| | | | |
|---|---|---|---|
| DE | 199 61 828 | | 6/2001 |
| DE | 100 06 176 | | 8/2001 |
| DE | 100 08 393 | | 8/2001 |
| DE | 602 07 476 | | 6/2006 |
| WO | WO 00/26630 | * | 5/2000 |

OTHER PUBLICATIONS

PCT Written Opinion of the International Searching Authority for International Application PCT/EP2007/011414, mailed Mar. 9, 2008, 5 pages, European Patent Office, Rijswijk, Netherlands, with partial English Translation, 2 pages.

* cited by examiner

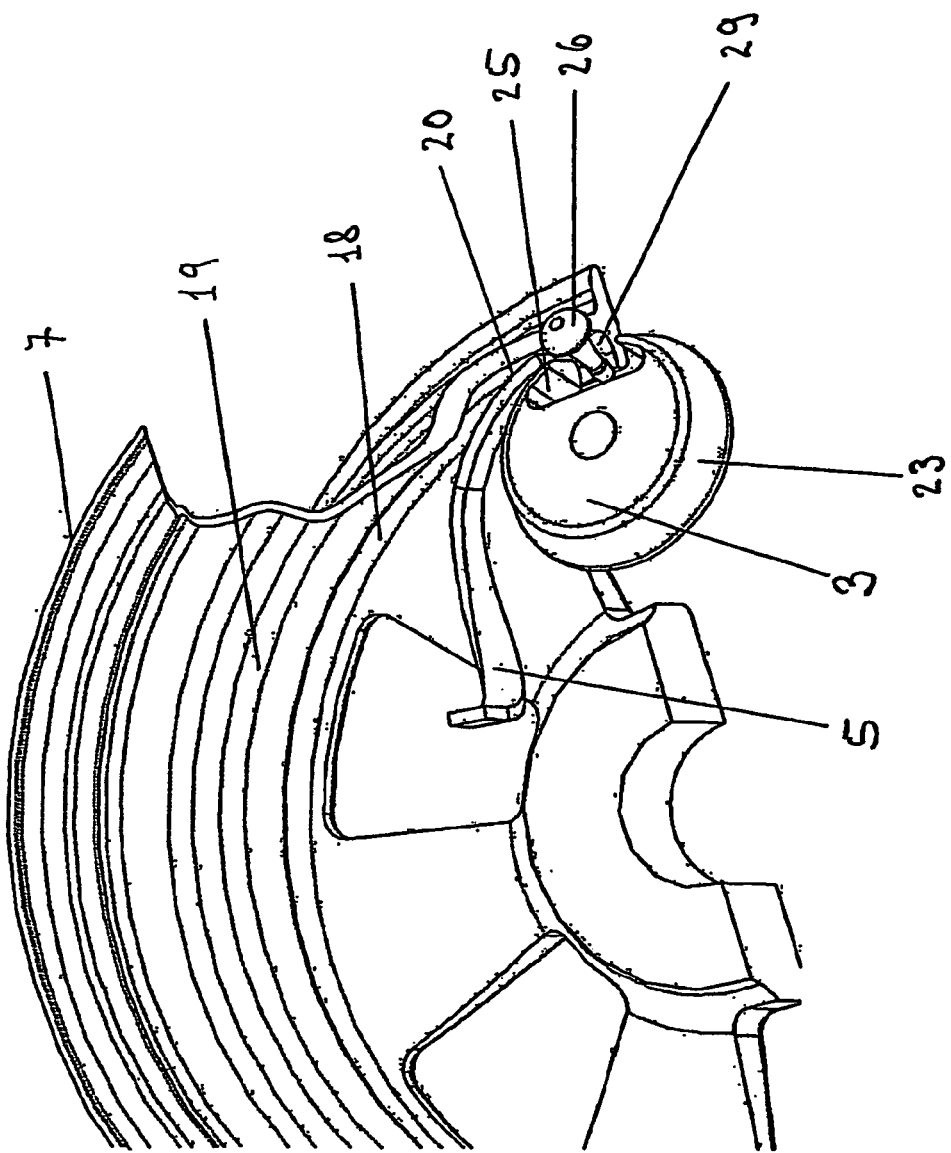

METHOD AND DEVICE FOR COMPENSATING UNBALANCES OF VEHICLE WHEELS

FIELD OF THE INVENTION

The invention relates to a method for compensating unbalance of vehicle wheels as well as an apparatus for carrying out the method.

BACKGROUND INFORMATION

In the balancing of rotating bodies, the unbalance is first determined during a test run, and thereafter usually in a further separate apparatus, a corresponding material removal by milling or boring is carried out at the determined compensation locations or corresponding compensation weights are secured in the prescribed compensation planes.

In the balancing of vehicle wheels, however, the determined unbalances are compensated only by the securing of compensation weights on the wheel rims or disk wheels, because a material removal there is excluded. For this, on steel wheel rims, the compensation weights are still mostly clamped tight on the inwardly-lying and outwardly-lying wheel rim flange of the corresponding compensation locations, for which pre-fabricated weights are provided in stepped weight sizes. Due to the multiplicity of the weight steps and the exact application of the weight clamps, such a balancing is still carried out largely manually even in the industrial production of new vehicle wheels.

At the present time, for weight reasons and due to the optical configuration, frequently vehicle wheels with light metal rims are preferably utilized for new vehicles, whereby the compensation weights are usually glued-on in the wheel rim bowl in two compensation planes that are axially spaced apart from one another. For that, partially automated balancing methods are known, which have considerably accelerated the balancing process.

A method and an apparatus for applying unbalance compensation weights onto a vehicle wheel with a program-controlled handling device in the form of a robot is already known from the DE 199 61 828 B4. Therein, a vehicle wheel that is to be balanced and that is transported in by a feed or supply line is grasped by an industrial robot and rotated about its wheel axis into a compensation position, and thereby is delivered to a first weight application tool for the first compensation plane. Before that, adhesive weight elements in the determined weight class were apparently manually provided to this weight application tool, previously the protective film was pulled off, and then the first compensation weight was applied by the first weight application tool in the provided first compensation plane. Thereafter, the robot again grasps the wheel and transports it to a second weight application tool for the second compensation plane, whereby in a similar manner the second compensation weight is glued or beaten onto the determined compensation surface. This partially automated method is primarily utilized in order to be able to apply both vehicle wheels with adhesive weights as well as vehicle wheels with beat-on weights, in one balancing line without equipment change-over work. Thereby, with this method, only the supplying and the rotating of the wheels into the determined angular position is automated, so that the cycle or station time decisively depends on the speed with which the determined individual weight steps can be selected and provided to the weight application tool and thereafter applied.

From the DE 100 06 176 A1, however, there is previously known exclusively an apparatus for the securing of compensation weights with an adhesive layer, in which the gluing or adhesive mounting is carried out largely automatically though. For that a guide arrangement is provided, which includes an angled arm that reaches into the disk wheel or wheel rim bowl, and on the forward end of which a press-on element is secured. For the balancing, first an adhesive weight with a correspondingly stepped weight value is manually set into a holding arrangement of the press-on element and the protective film is removed from the adhesive layer. Then the automated gluing or adhesive-bonding process is carried out, in which the arm submerges or extends linearly so far into the wheel rim bowl until it has reached the provided compensation plane. Then the wheel is positioned into the determined angular position, and through a radial arm movement then the press-on element is pressed onto the compensation location with a prescribed force. Thereby the adhesive weight contacts with its adhesive surface onto the compensation surface in the wheel rim bowl and is secured there by the adhesive bond. By the special embodiment or construction of the press-on element with leaf spring elements, the compensation weight is first applied in the middle of the compensation surface and by increasing the press-on force and deformation of the leaf spring elements it is also uniformly pressed onto the concavely curved press-on surface in the wheel rim bowl.

For the compensation of the vehicle wheel in the second compensation plane, the arm must again be moved linearly out of the wheel rim bowl and again manually be equipped or supplied with a provided compensation weight, whereby the previously described process is then again repeated, in order to completely balance a vehicle wheel. Due to the given facts of the construction of the disk wheel or the wheel rim, it can also be necessary to provide several weights in one compensation plane, whereby the compensation time increases considerably. In a currently typical cycle time or station time of one minute in the automobile industry, even such a partially automated balancing of five vehicle wheels per production unit in one minute is not possible with such a balancing machine. This prescribed cycle time or station time can then only be achieved with several parallel-arranged balancing machines or by a remotely located separate balancing of the wheels, for which then however the respectively needed wheel sets must be stocked and supplied in the exact cycle time.

A balancing apparatus for vehicle wheels with a short cycle time is, however, already known from the DE 199 22 085 A1. For that, preferably a program-controlled bent arm robot is provided, of which the pivot arm automatically moves to the compensation surface within the wheel rim bowl and uniformly presses-on the compensation weights radially onto the concave cylindrical compensation surfaces with a press-on arrangement. In that regard, the press-on arrangement consists of a special holding arrangement with two clamp jaws on which the provided compensation weight is clamped-in between two holding jaws. By the two clamping jaws, the compensation weight is uniformly pressed-on to the concavely curved compensation surfaces within the wheel rim bowl, and is secured or held by the adhesive surface that was previously removed from the protective film.

For the completely automatic balancing, the previously determined compensation weight is apparently unrolled from a roll in a separate preparation arrangement, and is cut-off to the corresponding length and released from the protective film. This compensation weight is then given over to the robot arm or its press-on arrangement, whereby it must be exactly clamped into the holding arrangements, which requires a very exact coordination of the two motion sequences. Especially in connection with rapid cycle times or station times and the thereby necessitated accelerations of the two transfer arms, transfer errors or faults are not excluded and can lead to longer production interruptions.

SUMMARY OF THE INVENTION

Therefore, it is the underlying object of the invention to provide a method and a balancing apparatus of the above described type, which makes it possible to carry out an operationally secure automatic mounting or securing of self-adhesive compensation weights of various different lengths on concavely curved securing or mounting surfaces in short cycle times.

This object is achieved by the invention as disclosed herein. An embodiment of the invention provides an apparatus for compensating an unbalance of a vehicle wheel by applying onto the wheel, at a determined compensation location on the wheel, a self-adhesive compensating weight having a determined length cut from a continuous weight strand. According to an embodiment of the invention, the apparatus comprises a program-controlled manipulator device including a movable working arm, and further comprises a balancing head mounted on the working arm. The balancing head includes a weight strand feed device adapted to feed the continuous weight strand, a cut-off device adapted to cut the compensating weight having the determined length from the continuous weight strand, and a roll-on roller adapted to apply the compensating weight onto the wheel at the determined compensation location by rolling on the compensating weight. The weight strand feed device comprises a feed channel having inner dimensions corresponding approximately to an outer width and thickness of the continuous weight strand so as to receive the continuous weight strand slidingly therein. The feed channel is configured and arranged to feed the continuous weight strand to the roll-on roller. The roll-on roller has a width corresponding approximately to the width of the continuous weight strand, and has an outer circumferential surface with a cylindrical or conical surface configuration. The apparatus further comprises a controlled rotation drive connected to and adapted to rotationally drive the roll-on roller. In another embodiment of the invention, the balancing head is mounted on a machine frame instead of on the working arm of the manipulator device, and the working arm carries a grasping device adapted to grasp and move the vehicle wheel to cooperate with the balancing head to carry out the compensating weight application. Further embodiments provide methods of using the apparatuses for carrying out unbalance compensation.

The invention has the advantage that due to the rolling-on or calendering-on of the compensation weight elements onto the curved inner wall of the wheel rim bowl, the compensation weights do not need to be pre-bent with a smaller radius of curvature than the inner radius of the wheel rim before the press-on process, because otherwise the weight would first adhere or stick fast on the ends and no complete adhesive bonding could take place in the middle of the weight. Because this pre-bending would have to be carried out before the removal of the protective film, and thereby it must be ensured that an elastic return-bending is avoided, therefore without such a rolling-off process an additional working step would be necessary, which would require additional cycle time.

The invention further has the advantage that due to the feeding or supplying of an endless weight strand, it is not necessary to supply and stock a plurality of stepped compensation weights and to select among these. Because this endless weight strand can both be applied roll-wise on the execution arm or be supplied externally, the refilling processes can be limited to a minimum.

In the invention it is further of advantage that the cutting-off or separating of the compensation weights is carried out directly before or during the securing process, so that the individual weight sections can also be released from the protective film just shortly before the roll-on process, whereby the maximum adhesive effectiveness is maintained due to the quickly following gluing-on or adhesive bonding process, and a thereby long and high adhesion capability is ensured.

A particular embodiment of the invention has the advantage that due to the supply of the endless weight strand with an execution arm of a program-controlled handling device all the way into the wheel rim bowl, no time-consuming return travel of the balancing head is necessary, so that both compensation planes can be balanced by a single reach-in or submersion motion process. Thereby it is advantageously possible to fully automatically balance a complete wheel set with up to five vehicle wheels within the typical production cycle time in the passenger automobile production process. In that regard it is especially of advantage, that the supply or feed of the weight, the positioning on the compensation surface, the separating of the compensation weights, and the securing or mounting by a roll-on process takes place in a coordinated coherent motion sequence, so that an optimization of the balancing time is achievable, without the balancing process being made more difficult by transfer processes.

A further particular embodiment of the invention has the advantage that due to the feed or supply device provided on the balancing head, the endless weight strand neither needs to be stored on the balancing head, nor the individual weight sections need to be transferred to the balancing head. Thereby a secure and rapid supply or feeding of the compensating weights is advantageously achieved, and interruptions due to the weight supply can hardly arise.

In a further particular embodiment of the invention, a feed slide channel is advantageously provided, through which a compensation weight deflection from the vertical feed or supply into the horizontal mounting or securing position, or vice versa, is achieved without cycle time losses. Thereby it is especially of advantage, that the weight deflection occurs free of interruption, so that a transfer error is avoided, which could otherwise easily lead to interruptions of the production process.

A particular embodiment of the invention with a roll-on roller has the advantage that therewith the compensation weights can be simultaneously supplied, cut-off or separated, and secured or mounted, in a continuous supplying and securing process, whereby the execution time is considerably shortened.

In a further embodiment form of the invention it is provided that the length cut-off device is integrated in the roll-on roller, whereby advantageously compensating weight transfer processes can be avoided, which could lead to transfer errors. Thereby the separating or cut-off process can be simultaneously carried out in a continuous supplying and securing process, whereby the cut-off process advantageously requires hardly any additional cycle time.

A further special embodiment form of the invention with a cone-shaped roll-on roller has the advantage that therewith also disk wheels with a so-called undercut can be automatically balanced. In this embodiment it is additionally of advantage, that in a particular form of the roll-on roller, a valve recess is provided, so that a valve provided in the undercut annular surface also does not cause interference.

BRIEF DESCRIPTION OF THE DRAWINGS

The invention is described more closely in connection with an example embodiment, which is shown in the drawing. It is shown by.

DETAILED DESCRIPTION OF EXAMPLE EMBODIMENTS OF THE INVENTION

Figure 1:
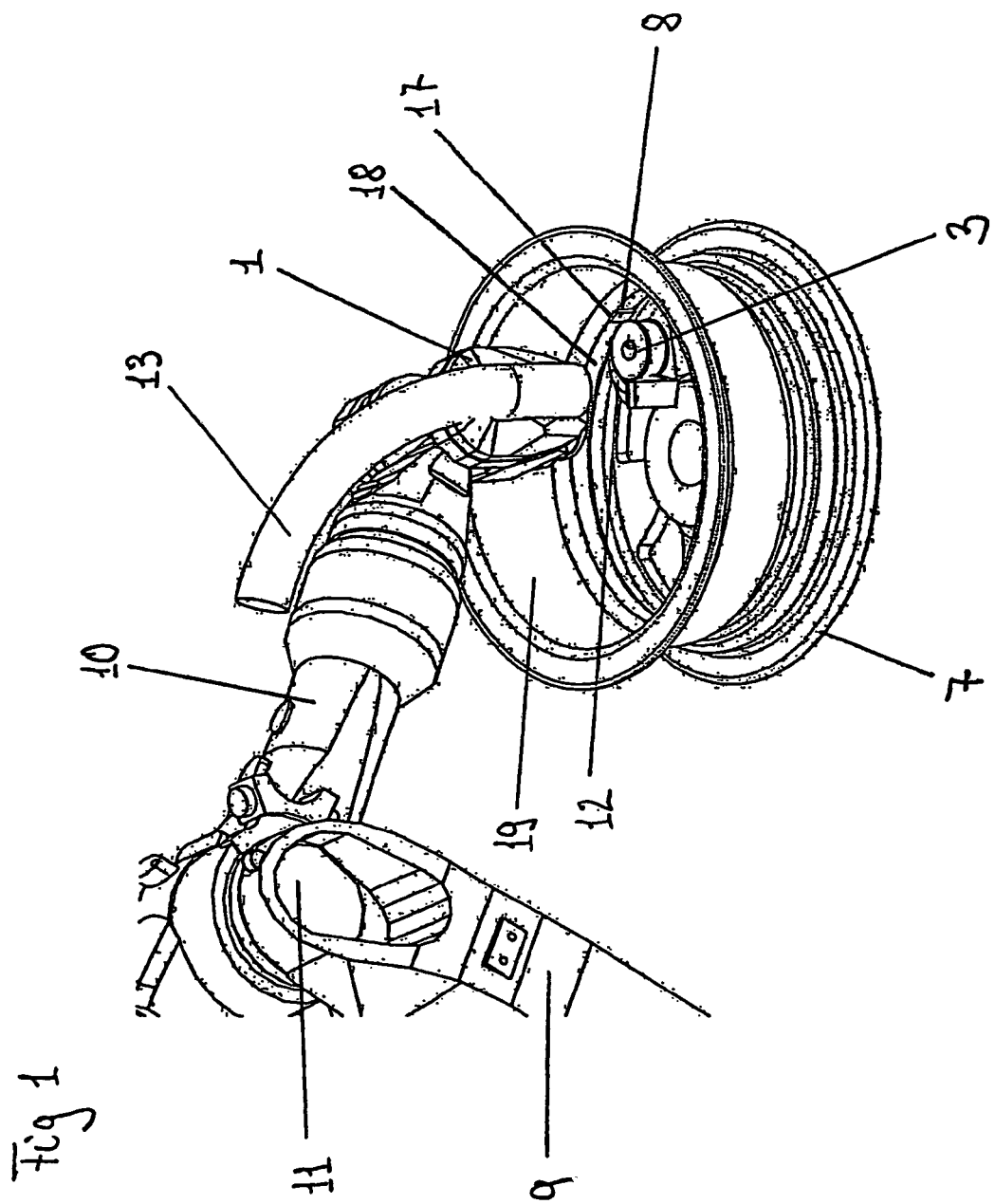
FIG. 1 an arm of a handling device, with a schematically illustrated balancing head, reaching into a wheel rim bowl.

In FIG. 1 of the drawing there is illustrated a part of an apparatus for the balancing of vehicle wheels, in which a balancing head 1 is arranged on an execution arm or working arm 10 of a handling device 9. The balancing head 1 supplies or feeds a flexible endless weight band 5 of adhesively mountable compensating weights 8 in the area of the compensation location, there releases it from the protective film 16, positions it over the compensation surface 17, and then cuts off the endless weight strand 5 in the determined length and presses it onto the compensation surface 17.

For that, preferably an execution arm or working arm 10 of a so-called program-controlled robot as a handling device 9 is utilized, of which the motion in all three spatial directions is controllable. However, execution arms 10 of simpler handling devices 9 can also be selected, which are at least introducible linearly into the disk wheel or wheel rim bowl 19 and are movable radially to the compensation plane 18. In that regard it is also conceivable that the angular position of the balancing position can be carried out in a controlled manner by a wheel rotation.

On the execution arm 10 there is mounted a special balancing head 1, which carries out the supply or feeding, cutting-off to length, and adhesive mounting of the compensation weights 8. The balancing head 1 is at least radially pivotably secured on the execution arm 10. The execution arm 10 is supported preferably entirely rotatably on the handling device 9, and can be axially moved into the wheel rim bowl 19 by a further pivot bearing 11. Therefore, the balancing head 1 is positionable in a program-controlled manner so that it can move the compensation weights 8 to each compensation location 17 in the prescribed compensation planes 18. The prescribed compensation planes 18 are mostly located on the cylinder-shaped concave embodied inner surfaces within the wheel rim bowl 19, which are axially spaced apart from one another. The concrete compensation locations 17 and the size of the compensation weights 8 are calculated by the unbalance measuring apparatus and are electronically transmitted or provided to the robot control.

The execution arm 10 is then controlled so that its balancing head 1 submerges or reaches into the wheel rim bowl 19 such that it is located opposite and radially spaced apart from the inner compensation surface 17. In that regard, the balancing head 1 includes a feed or supply device 2 with a feed slide channel 12, a press-on device with a roll-on roller 3 and a length cut-off device 4, which are illustrated schematically in detail in FIG. 2 of the drawing. An endless weight strand 5 is supplied through a feed hose 13 to the feed device 2, and the endless weight strand 5 is preferably taken off a rolled-up roll of adhesive weight elements on the handling device 9. Such flexible endless weight strands with adhesive mountable compensation weight elements are known from the DE 100 08 393 A1, of which the individual weight elements are welded into a band of thermoplastic synthetic plastic material. In that regard, individual separatable elements are aligned in a row one after another in the weight strand, whereby the separatable number of the elements determines the compensation weight. The endless weight strand is approximately 15 to 25 mm wide and comprises a self-adhesive layer 20 on a carrier layer, and the self-adhesive layer 20 is protected by a cover film 16.

At present, endless weight strands 5 of the 3M company are also known, in which a metal powder of high density, preferably stainless steel powder, is embedded in a rectangular synthetic plastic band with a width of approximately 15 to 25 mm and a thickness of approximately 3 to 6 mm. The endless weight strand is itself flexible and consists of approximately 65 to 68% metal powder of high density and a plastically deformable synthetic plastic material. In that regard, one flat side of the strand is provided with a self-adhesive layer 20, which is covered by a protective film 16. This synthetic plastic encased, endless weight band 5 has an exactly prescribed weight per length and can be separated or cut-off to every desired weight value of arising compensation weights 8, and is thus also suitable for the balancing of vehicle wheels.

The endless weight strand 5 is first threaded into the feed device 2 secured on the balancing head 1, in which feed device 2 preferably two driven press-on rollers are provided, between which the endless weight strand 5 runs through. Thereby the drive is moved in a program-controlled manner, whereby the motion direction 27 is controllable in the feed advance and return stroke direction. If the unbalance measuring apparatus has determined a certain weight value for the prescribed compensation planes 18, then from that a prescribed length cut-off value of the endless weight strand 5 is calculated in this or a separate evaluating device, and the feed device 2 is controlled so that it feeds the endless weight strand 5 by this calculated length value to the length cut-off device 4. Thereby the endless weight strand 5 slides along a specially configured feed slide channel 12 to the press-on and length cut-off device.

In that regard, the feed slide channel 12 is configured such that it guides the endless weight strand 5 past a curved radial inner wall in such a manner so that the vertically slidingly advanced endless weight strand 5 is deflected into a horizontal press-on plane. In that regard, the feed slide channel 12 consists of a flat sheet metal or flat steel element, that is bent like a hollow track 14 and like a longitudinally extended half threaded element, and leans against a roll-on roller 3 at the bottom in a horizontal press-on plane. Thereby the feed slide channel 12 is radially bent and is matched with its bottom end region to the shape of the following roll-on roller 3 of the press-on device in a partial circular curve 22. The feed slide channel 12 is secured with its hollow track 14 on a roll-up device 15, which in turn is arranged on the balancing head 1. On the rounded tapering end of the feed slide channel 12, the protective film 16 is guided back over its rounded nose 21 or a deflection roller from the adhesive layer 20, and is rolled up on a program-controlled roller of the roll-up device 15. Thereby the roll-up device 15 is controlled synchronously with the feed device 2. The protective film 16 could, however, also be sucked away by a suction device.

If the endless weight band 5 is slidingly advanced by the calculated compensation weight value and freed or released from the protective film 16, then it is automatically cut off by the length cut-off device 4. For that, the part of the endless weight strand 5 provided as the compensation weight 8 is lightly or loosely clamped-in at the end of the feed slide channel 12, between the latter and a rubber-coated roll-on roller 3, so that it is movable in both rotation directions 28 by the roll-on roller 3. The roll-on roller 3 is connected with a controlled drive, which can move it forwards and backwards.

The length cut-off device 4 is preferably integrated into the roll-on roller 3. The length cut-off device 4 essentially consists of a cutting knife 24, which is arranged transversely to the endless weight strand 5 running past, and can be brought into the provided cut-off position by the roll-on roller 3. The roll-on roller 3 is similarly rotated or turned synchronously to the feed device 2 by the program-controlled control in the separate evaluating device or in the unbalance measuring apparatus or the balancing machine, so that the endless weight strand 5 is moved in a continuous feed advance process from the feed device 2 via the feed slide channel 12 to the length cut-off device 4.

In the roll-on roller 3, the cutting knife 24 is radially slidably arranged in a radial groove of the roll-on roller 3, and can be brought into the provided cut-off position by the roll-on roller 3. The cutting knife 24 is radially movable by a slightly conical, axially slidable drive axle in the roll-on roller 3, in order to cut-off the endless weight strand 5. In that regard, a transverse groove is provided in the feed slide channel 12 at a particular cutting position, preferably in the partial circular curve 22, which transverse groove prevents a cutting-through of the protective film 16 and lies opposite the cutting knife 24 during the cutting-off process. Thereby, the endless weight strand 5 is slidingly advanced corresponding to the prescribed compensation weight value 8, so that it is still clamped-in with only a small guide region between the feed slide channel 12 and the roll-on roller 3, in which the cutting knife 24 is located exactly in the cut-off position and cuts-off the provided compensation weight section as compensation weight 8 by a radial movement of the cutting knife 24.

Simultaneously, through the control of the balancing head 1, the roll-on roller 3 is pressed with the exposed adhesive surface 20 of the compensation weight section 8 onto the provided compensation surface 17 in the disk wheel or wheel rim bowl, and is rolled onto the compensation surface 17 by a coordinated rotating motion with the roll-on roller 3. Due to the coordinated motion sequences between the balancing head 1, the feed device 2, the roll-up device 15, the roll-on roller 3 and the length cut-off device 4, the automatic securing or mounting of the compensation sections as compensation weights 8 on the concave inner wall of the wheel rim bowl 19 has been successfully tested in practical tests with cycle times or station times of 5 to 8 seconds. Such a fully automatic balancing method is also possible with an endless weight strand 5 with stepped weight inserts in a synthetic plastic encasement as according to the DE 100 08 393 A1, whereby then it must be separated or cut-off at the prescribed length sections. Such a fully automatic balancing of vehicle wheels is also possible with a vertical wheel position, whereby the balancing head 1 then reaches or submerges horizontally into the wheel rim bowl 19. The vehicle wheel can also simultaneously be turned in a program-controlled manner into the determined angular position.

Figure 2:
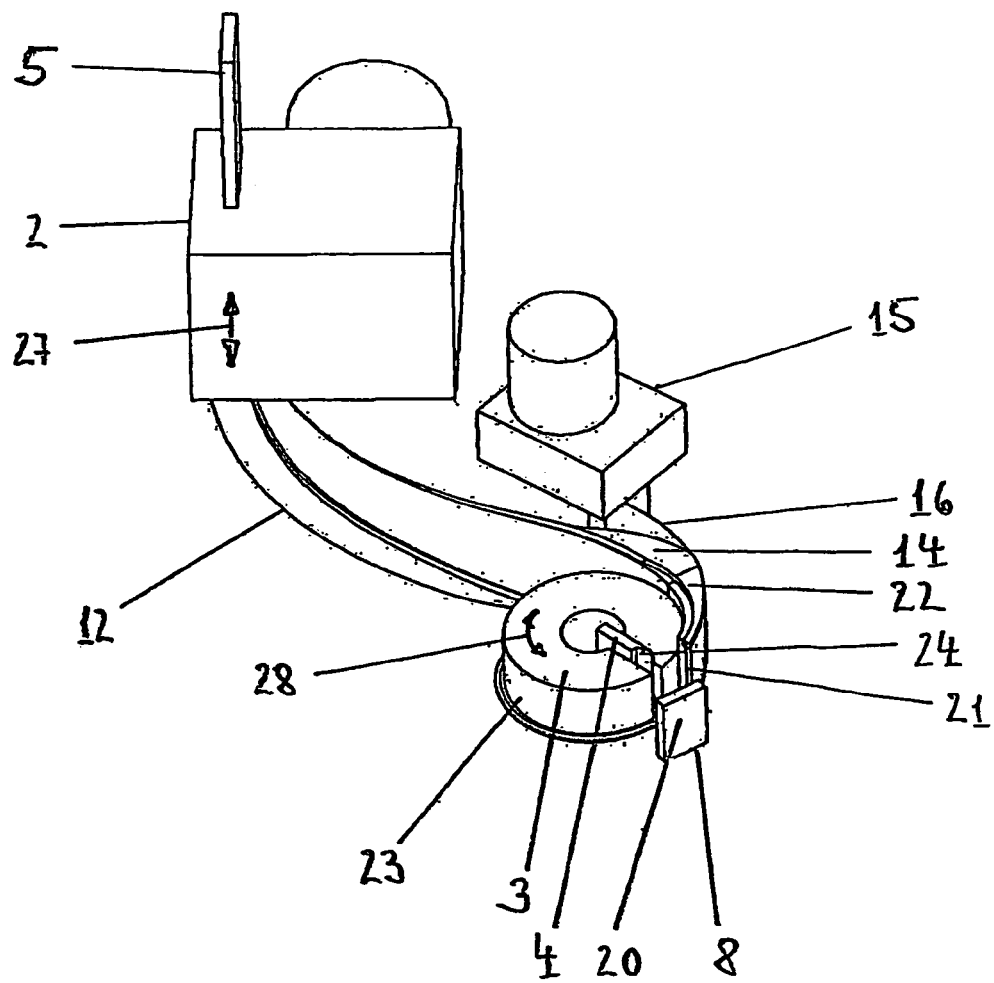
FIG. 2 a schematic illustration of a balancing head.
Figure 3:
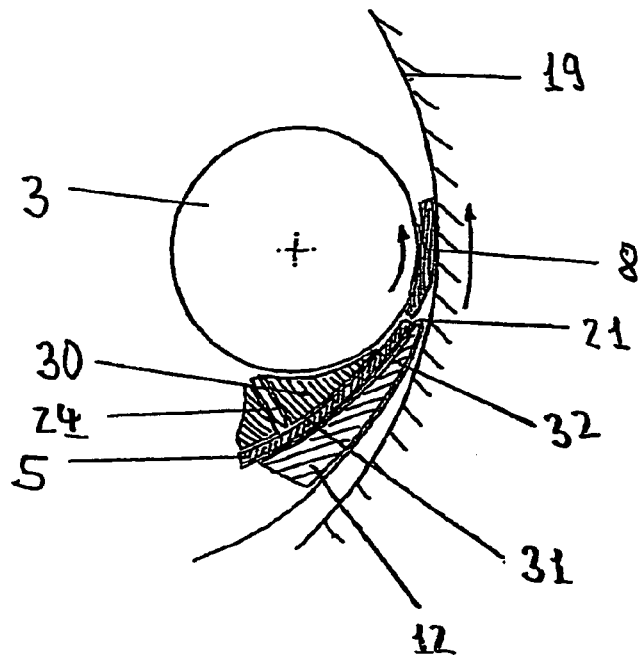
FIG. 3 a schematic illustration of a balancing head with a length cut-off device arranged before the roll-on roller FIG. 4 a schematic illustration of a balancing head with a cone-shaped roll-on roller, and FIG. 5 a stationary or locationally fixed, schematically illustrated, balancing head over which a vehicle wheel is positioned with an arm a handling device.

The length cut-off device 4 can also be provided outside of the roll-on roller 3. Such a particular embodiment is schematically illustrated in FIG. 3 of the drawing, where the length cut-off device 4 is arranged between the feed slide channel 12 and the roll-on roller 3. For that, the length cut-off device 4 has a separate knife holder or mount 30, in which the cutting knife 24 is supported. The knife holder 30 is embodied approximately wedge-shaped and extends in a gap between the feed slide channel 12 and the roll-on roller 3. In that regard, the knife holder 30 includes, opposite or relative to the feed slide channel 12, a guide wall 31 that is spaced apart from the latter, along which guide wall the endless weight strand 5 is guided to the press-on calender or roller 3. This guide wall 31 ends in the feed advance direction before the nose 21 of the feed slide channel 12, so that the roll-on roller 3 can be brought into engagement in this area with the cut-to-length compensation weight 8. In a provided spacing distance to the tip or apex 32 of the guide wall 31, a radial groove is provided in the knife holder 30 at a right angle to the endless weight strand 5, in which radial groove the cutting knife 24 is arranged radially slidably. The cut-off process and the subsequent gluing or adhesive mounting of the cut-to-length compensation weights 8 on the concave inner wall of the wheel rim bowl 19 is carried out as already described above with regard to FIG. 1 and FIG. 2 of the drawing.

Such a fully automatic balancing of vehicle wheels with adhesive weights is also possible with disk wheels 7 with a so-called undercut 29. A special example embodiment of this apparatus is illustrated in FIG. 4 of the drawing. For weight reasons, at the present time often light metal wheel rims 7 or disk wheels with an undercut 29 are utilized, in which a rear material ring surface or annular surface is milled or turned off in front of the spoke frustum or hub, whereby the compensation weights 8 preferably shall be set into this undercut annular or ring surface 29. For this, the roll-on roller 3 is provided with a conical roll-on surface on the outer circumferential surface 23, so that this undercut ring or annular surface 29 is also reachable by a tangential roll-on process. However, often also the valve seats or stems 26 are arranged in this undercut ring or annular surface 29, which make a balancing at this location more difficult. One could achieve this by two compensation weights 8 arranged symmetrically spaced from the valve 26, but this is often not desired. Therefore the invention has provided a roll-on roller 3 with a valve recess 25, with which can be rolled over the valve seat or stem 26, and in fact closely to the valve body on one or two sides. In this embodiment, preferably a length cut-off device 4 is provided, in which the cutting knife 24 is supported in a separate knife holder 30 before or in front of the roll-on roller 3 as according to FIG. 3 of the drawing.

In a preferred embodiment it is thereby provided, that the endless weight strands 5 are supplied or fed to the roll-on roller 3 from both tangential sides. For this, then two separate feed devices 2 and length cut-off devices 4 would be necessary, so that advantageously also a longer supply of endless weight material 5 is available, so that the interruption times for necessary weight strand refills are shortened.

Figure 5:
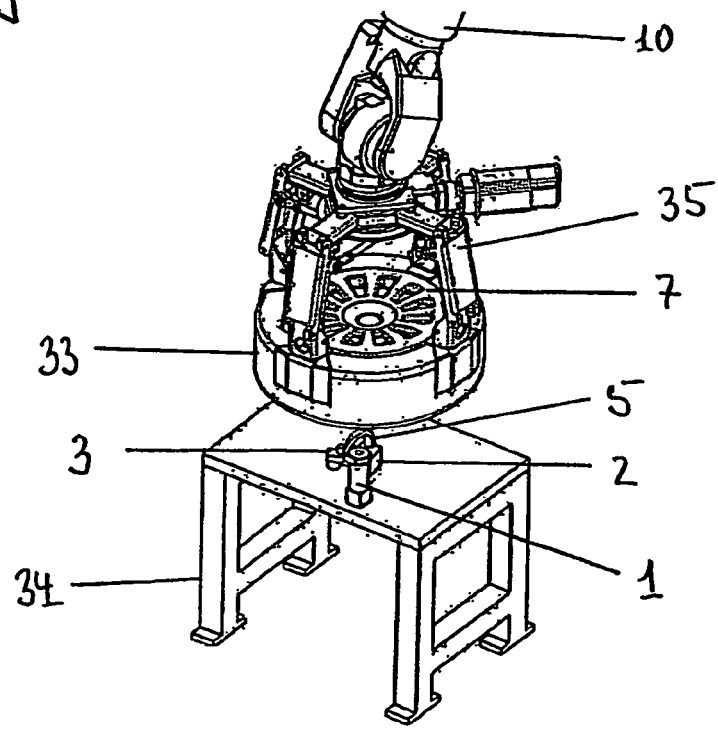

In a further particular type of embodiment, the balancing head 1 with its feed device 2, its length cut-off device 4 and its roll-on roller 3 can also be arranged stationarily on a machine frame 34. In that regard, the vehicle wheel 33 with its wheel rim bowl 19 is then tipped over the stationary balancing head 1 by an execution arm 10 of a program-controlled handling device which is not shown, and is controlled synchronously with the balancing head 1. Such a type of embodiment is schematically illustrated in FIG. 5 of the drawing. In that regard, a stationary machine frame 34 is provided within the wheel supply or feed line, and the stationary balancing head 1 is secured on the horizontal plate thereof. The balancing head 1 includes a feed device 2, which guides the endless weight strand 5 from below via a feed slide channel 12 along a length cut-off device 4 to the roll-on roller 3. The balancing head 1 can be embodied as illustrated in FIG. 2 to FIG. 4 of the drawing and can be embodied as in the embodiments described in connection therewith.

In that regard, for the balancing, the vehicle wheel 33 with its wheel rim bowl 19 is tipped over the balancing head 1. For that, the vehicle wheel 33 is first grasped along its running surface by a special grasping device 35, and in a horizontal orientation with the open wheel rim bowl is tipped preferably from above over the vertically oriented balancing head 1. In that regard, the execution arm 10 of the handling device, which is not shown, is controlled vertically into the provided first compensation plane with the aid of the unbalance measurement data. Then the vehicle wheel 33 is rotated or turned so far about its rotation axis until the determined compensation angle position of the compensation location is located opposite the balancing head 1 in the allocated first compensation plane. Such a control can be carried out in a known manner with many program-controlled handling devices 9.

Simultaneously thereto, the endless weight strand 5 in the determined length in the balancing head 1 is supplied or fed to the roll-on roller 3, cut-off to length, released from the protective film, and pressed onto the beginning of the compensation surface on the inner wall of the wheel rim bowl 19 by a radial motion of the execution arm 10. It is, however, also conceivable to embody the balancing head 1 so that its roll-on roller 3 carries out a radial motion, by which the cut-to-length compensation weight is pressed-on to the beginning of the compensation surface. Thereafter, both the vehicle wheel 33 as well as the roll-on roller 3 are synchronously rotated or turned so far until the compensation weight is completely glued-on or adhesively bonded to the compensation surface.

Thereafter the vehicle wheel 33 is vertically lifted or lowered into the second compensation plane, in order to next be rotated or turned into the second compensation angle position. The execution and adhesive bonding of the second compensation weight then proceeds with the same method steps as described above with regard to the first compensation plane. In that regard, the entire balancing process is controlled according to a program by a coordinated proceeding motion sequence between the execution arm 10 with the vehicle wheel 33 and the balancing head 1, so that thereby a complete vehicle wheel 33 can be fully automatically balanced in two compensation planes in the shortest time.

The invention claimed is:

1. An apparatus for compensating an unbalance of a vehicle wheel by applying onto the wheel, at a determined compensation location on the wheel, a self-adhesive compensating weight having a determined length cut from a continuous weight strand, wherein said apparatus comprises:
   a program-controlled manipulator device including a movable working arm; and
   a balancing head mounted on said working arm, wherein said balancing head includes a weight strand feed device adapted to feed the continuous weight strand, a cut-off device adapted to cut the compensating weight having the determined length from the continuous weight strand, and a roll-on roller adapted to apply the compensating weight onto the wheel at the determined compensation location by rolling on said compensating weight;
   wherein said weight strand feed device comprises a feed channel having inner dimensions corresponding approximately to an outer width and thickness of the continuous weight strand so as to receive said continuous weight strand slidingly therein, and wherein said feed channel is configured and arranged to feed the continuous weight strand to said roll-on roller; and
   wherein said roll-on roller has a width corresponding approximately to the width of the continuous weight strand, and has an outer circumferential surface with a cylindrical or conical surface configuration; and
   further comprising a controlled rotation drive connected to and adapted to rotationally drive said roll-on roller.

2. The apparatus according to claim 1, wherein said feed channel comprises a longitudinally elongated spiraled flat hollow track having a guide width corresponding approximately to the width of the continuous weight strand and having a depth corresponding approximately to the thickness of the continuous weight strand, wherein said spiraled flat hollow track has a spiraling that encompasses approximately one half of a spiral turn.

3. The apparatus according to claim 1, wherein the feed device includes controllable feed advance and return stroke elements adapted for moving the continuous weight strand.

4. The apparatus according to claim 1, wherein the continuous weight strand includes an adhesive layer and a protective film covering a surface of the adhesive layer, wherein said apparatus further comprises a roll-up device or a suction device, and wherein said feed channel includes a rounded-off nose or deflection roller on a transfer area thereof adjacent to said roll-on roller, on which nose or deflection roller the protective film can be guided back to said roll-up device or sucked away by said suction device.

5. The apparatus according to claim 4, comprising said roll-up device arranged on said balancing head, wherein said roll-up device includes a controlled roll-up roller by which the protective film can be rolled-up synchronously to a feeding of the continuous weight strand by said weight strand feed device.

6. The apparatus according to claim 1, wherein said feed channel has a partial circular curve in an end region thereof, which partial circular curve is matched to a diameter of said roll-on roller and is arranged opposite said roll-on roller.

7. The apparatus according to claim 1, wherein said cut-off device is integrated in said roll-on roller and is arranged so that said cut-off device can cut off said determined length of said continuous weight strand at a right angle.

8. The apparatus according to claim 7, wherein said cut-off device comprises a controlled cut-off drive and a cutting knife that is guided in a radial groove in said roll-on roller and is connected with said controlled cut-off drive, by which said cutting knife is radially movable forwards and backwards.

9. The apparatus according to claim 1, wherein said cut-off device is arranged between said feed channel and said roll-on roller so that said cut-off device can cut off said determined length of said continuous weight strand at a right angle.

10. The apparatus according to claim 9, wherein said cut-off device comprises a knife holder, a controlled cut-off drive and a cutting knife that is guided in a radial groove in said knife holder and is connected with said controlled cut-off drive, by which said cutting knife is radially movable forwards and backwards.

11. The apparatus according to claim 1, wherein the continuous weight strand includes a protective film covering an adhesive surface thereof, said cut-off device comprises a cutting knife, said feed channel has a transverse groove therein in an end region adjacent to said roll-on roller, said transverse groove is located opposite said cutting knife during a cut-off process by said cut-off device, and said transverse groove has a depth so that the protective film remains undamaged during the cut-off process.

12. The apparatus according to claim 1, wherein said roll-on roller has a valve-receiving recess in said outer circumferential surface thereof, which valve-receiving recess is located and dimensioned so as to receive therein a valve stem of said vehicle tire and so that therewith one or more of said compensation weights can be applied onto the vehicle wheel adjacent to the valve stem on one or both sides.

13. The apparatus according to claim 12, further comprising a second feed device having a second feed channel adapted to feed a second continuous weight strand, wherein said roll-on roller is connected with both of said feed devices, and wherein said feed channels respectively feed said continuous weight strands to two sides of said valve-receiving recess.

14. The apparatus according to claim 1, wherein said balancing head is arranged on an end of said working arm of said manipulator device, and further comprising a feed hose that is arranged externally along said working arm and that is adapted to feed the continuous weight strand in said feed hose to said feed device.

15. A method of using the apparatus according to claim 1 for compensating an unbalance of a vehicle wheel, comprising the steps:
  a) supplying the continuous weight strand to said balancing head;
  b) using said weight strand feed device, controlledly feeding the continuous weight strand to said roll-on roller;
  c) using said roll-on roller, pressing a start end of the continuous weight strand or of the compensating weight onto a start end of the determined compensation location of the wheel, and then rolling along the continuous weight strand or the compensating weight for application thereof onto the determined compensation location of the wheel; and
  d) using said cut-off device, cutting the compensating weight having the determined length from the continuous weight strand before or during said step c).

16. The method according to claim 15, further comprising controlledly moving said working arm and said balancing head to reach said balancing head into a wheel rim bowl of the vehicle wheel before said step c), and wherein said pressing in said step c) comprises moving said balancing head radially outwardly and said rolling in said step c) comprises moving said balancing head circumferentially relative to said vehicle wheel.

17. The method according to claim 16, wherein during said moving to reach said balancing head into the wheel rim bowl, said feed device feeds the continuous weight strand by the determined length and said cut-off device cuts the compensating weight having the determined length from the continuous weight strand, and simultaneously therewith or thereafter a protective film is removed from the continuous weight strand or the compensating weight and said step c) is carried out.

18. The method according to claim 16, wherein the wheel rim bowl is oriented lying horizontally, and wherein said feed device feeds the continuous weight strand first essentially vertically into the wheel rim bowl and then said feed channel redirects the continuous weight strand through a spiraling motion into a horizontal plane and feeds the continuous weight strand to the roll-on roller.

19. The method according to claim 16, wherein the wheel rim bowl is oriented standing vertically, and wherein said feed device feeds the continuous weight strand first essentially horizontally into the wheel rim bowl and then said feed channel redirects the continuous weight strand through a spiraling motion into a vertical plane and feeds the continuous weight strand to the roll-on roller.

20. The method according to claim 15, wherein the continuous weight strand includes a protective film covering an adhesive surface thereof, and further comprising removing the protective film directly before said step c) and before or during a transferring of the continuous weight strand or the compensating weight to said roll-on roller.

21. The method according to claim 15, wherein said compensating of the unbalance of the vehicle wheel is carried out fully automatically by a program-controlled operation of said manipulator device by a motion sequence proceeding with said balancing head in a wheel rim bowl of the vehicle wheel, and wherein said compensating is carried out on two compensation planes on the vehicle wheel within a time of 5 to 20 seconds.

22. An apparatus for compensating an unbalance of a vehicle wheel by applying onto the wheel, at a determined compensation location on the wheel, a self-adhesive compensating weight having a determined length cut from a continuous weight strand, wherein said apparatus comprises:
  a balancing head mounted on a machine frame, wherein said balancing head includes a weight strand feed device adapted to feed the continuous weight strand, a cut-off device adapted to cut the compensating weight having the determined length from the continuous weight strand, and a roll-on roller adapted to apply the compensating weight onto the wheel at the determined compensation location by rolling on said compensating weight; and
  a program-controlled manipulator device including a movable working arm and a grasping device that is mounted on said working arm and adapted to grasp the vehicle wheel and move the vehicle wheel into a position with an open wheel rim bowl of the vehicle wheel over said balancing head;
  wherein said weight strand feed device comprises a feed channel having inner dimensions corresponding approximately to an outer width and thickness of the continuous weight strand so as to receive said continuous weight strand slidingly therein, and wherein said feed channel is configured and arranged to feed the continuous weight strand to said roll-on roller; and
  wherein said roll-on roller has a width corresponding approximately to the width of the continuous weight strand, and has an outer circumferential surface with a cylindrical or conical surface configuration; and
  further comprising a controlled rotation drive connected to and adapted to rotationally drive said roll-on roller.

23. A method of using the apparatus according to claim 22 for compensating an unbalance of a vehicle wheel, comprising the steps:
  a) using said grasping device and said working arm, grasping the vehicle wheel and controlledly moving the vehicle wheel to the position with the open wheel rim bowl of the vehicle wheel over the balancing head;
  b) during or after said step a), using said grasping device and said working arm, turning said vehicle wheel to a determined compensation angle orientation and positioning said vehicle wheel on a determined compensation plane relative to said balancing head;
  c) using said feed device and said cut-off device, feeding the continuous weight strand and cutting the compensating weight from the continuous weight strand; and
  d) by a controlled radial motion of at least said working arm or said balancing head, the compensating weight is pressed and rolled onto the determined compensation location on the vehicle wheel.

24. The method according to claim 23, wherein said step b) comprises lowering the open wheel rim bowl of the vehicle wheel down over said balancing head until said roll-on roller is aligned on the determined compensation plane and rotating the vehicle wheel about a wheel axis thereof until a starting end of the determined compensation location is aligned opposite said roll-on roller.

25. The method according to claim 23, wherein said step c) is performed during said step b), said step d) is performed after said step c), and in said step d) the compensating weight is rolled onto the determined compensation location by a synchronized motion process in which said manipulator device rotates the vehicle wheel about a wheel axis thereof and said controlled rotation drive rotates said roll-on roller to roll along an inner surface of the open wheel rim bowl until the compensating weight is applied onto the determined compensation location.

* * * * *